United States Patent
Chen et al.

(10) Patent No.: US 10,320,583 B2
(45) Date of Patent: Jun. 11, 2019

(54) SYSTEM AND METHOD FOR FACILITATING INTEROPERABILITY ACROSS INTERNET OF THINGS (IOT) DOMAINS

(71) Applicant: Verizon Patent and Licensing Inc., Arlington, VA (US)

(72) Inventors: Ming Chen, Bedford, MA (US); Jianxiu Hao, Acton, MA (US); Zhong Chen, Acton, MA (US); Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 208 days.

(21) Appl. No.: 15/288,335

(22) Filed: Oct. 7, 2016

(65) Prior Publication Data
US 2018/0102916 A1    Apr. 12, 2018

(51) Int. Cl.
*H04L 12/46*    (2006.01)
*H04L 29/08*    (2006.01)
*G06F 16/36*    (2019.01)

(52) U.S. Cl.
CPC ............ *H04L 12/46* (2013.01); *G06F 16/367* (2019.01); *H04L 12/4625* (2013.01); *H04L 67/12* (2013.01); *H04L 67/303* (2013.01); *H04L 67/327* (2013.01)

(58) Field of Classification Search
CPC ...................................................... H04L 12/46
See application file for complete search history.

(56) References Cited

U.S. PATENT DOCUMENTS

| | | | | |
|---|---|---|---|---|
| 9,774,626 | B1* | 9/2017 | Himler | H04L 63/1433 |
| 10,009,410 | B2* | 6/2018 | Huang | H04L 67/06 |
| 2008/0215519 | A1* | 9/2008 | Runge | G06F 17/271 |
| | | | | 706/47 |
| 2013/0096831 | A1* | 4/2013 | Chan | H04W 4/043 |
| | | | | 702/1 |
| 2014/0241354 | A1* | 8/2014 | Shuman | H04L 67/16 |
| | | | | 370/390 |
| 2014/0244568 | A1* | 8/2014 | Goel | H04W 4/08 |
| | | | | 706/52 |
| 2014/0278436 | A1* | 9/2014 | Khanna | G10L 21/00 |
| | | | | 704/275 |

(Continued)

*Primary Examiner* — Parth Patel

(57) ABSTRACT

A network device receives a plurality of framework definitions corresponding to a respective plurality of device platforms, wherein each of the device platforms comprises at least one device. The network device generates a plurality of generalized framework definitions for each of the plurality of device platforms, wherein the plurality of generalized framework definitions comprise basic linguistic components corresponding to elements in the respective plurality of framework definitions. The network device receives data from the at least one device for each of the device platforms. The network device extracts data from the received data based on the plurality of generalized framework definitions. The network device automatically identifies contexts that include at least one device for each of the at least two device platforms based on the extracted data. The network device transmits instructions to the at least one device for each of the at least two device platforms based on one of a rule or a request associated with the identified one or more contexts.

16 Claims, 6 Drawing Sheets

(56) References Cited

U.S. PATENT DOCUMENTS

| | | | | |
|---|---|---|---|---|
| 2014/0324973 | A1* | 10/2014 | Goel | H04W 4/70 709/204 |
| 2016/0041534 | A1* | 2/2016 | Gupta | G05B 13/0265 700/275 |
| 2016/0073395 | A1* | 3/2016 | Liberg | H04W 4/70 370/329 |
| 2017/0010860 | A1* | 1/2017 | Henniger | G06F 3/167 |
| 2017/0180067 | A1* | 6/2017 | Poornachandran | H04H 20/71 |
| 2017/0279682 | A1* | 9/2017 | Dawson | H04L 41/0893 |
| 2017/0300823 | A1* | 10/2017 | Bostick | H04L 67/306 |
| 2017/0345420 | A1* | 11/2017 | Barnett, Jr. | G10L 15/22 |
| 2018/0039477 | A1* | 2/2018 | Sung | G06F 3/167 |
| 2018/0039478 | A1* | 2/2018 | Sung | G06F 3/167 |
| 2018/0054487 | A1* | 2/2018 | Hebsur | H04L 67/12 |
| 2018/0058875 | A1* | 3/2018 | Wan | G01C 21/3484 |

\* cited by examiner

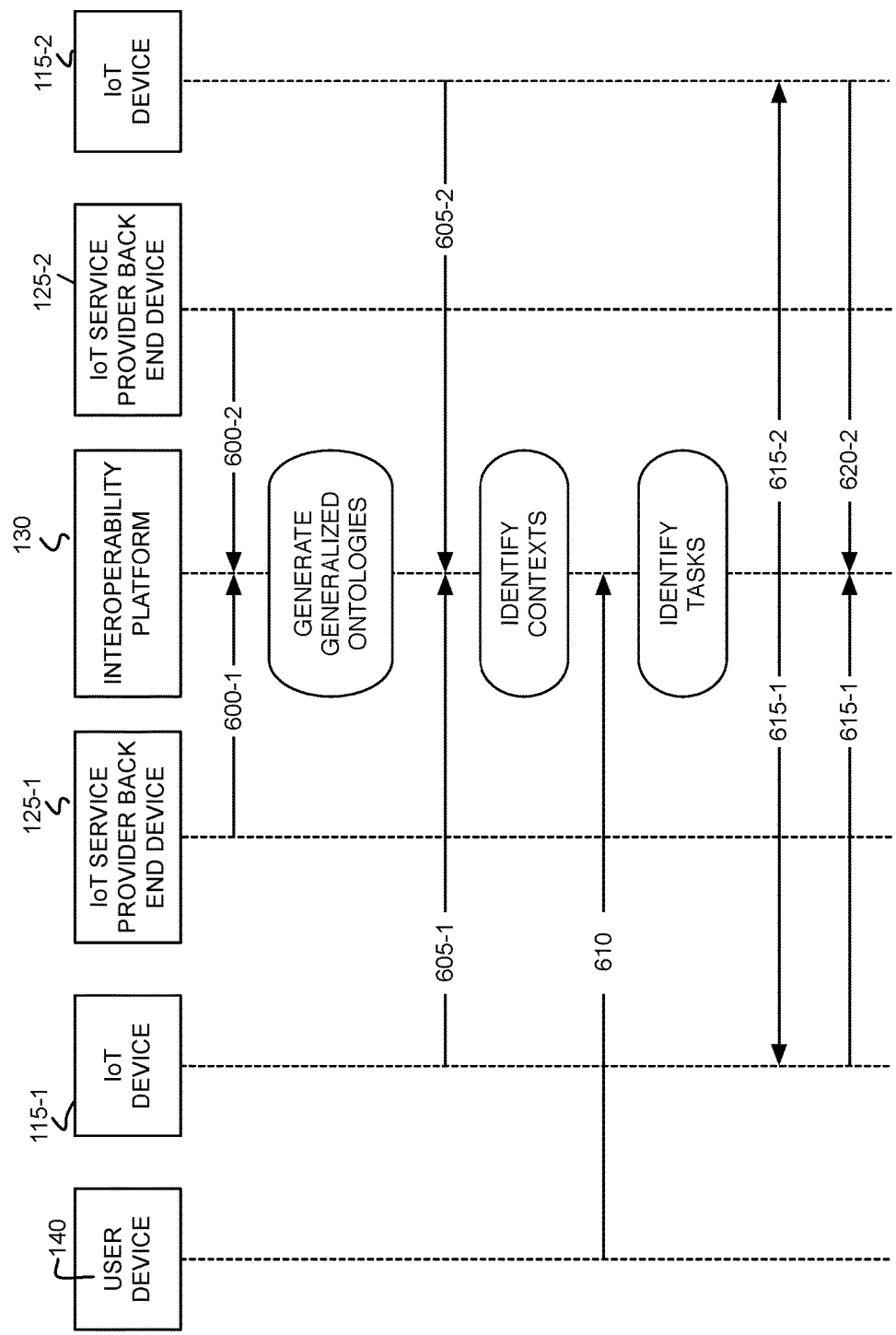

SYSTEM AND METHOD FOR FACILITATING INTEROPERABILITY ACROSS INTERNET OF THINGS (IOT) DOMAINS

BACKGROUND

The "Internet of Things" (IoT) is a network of physical devices (i.e., "things") specially designed for specific functions, unlike general computing devices like desktop or laptop computers or even smart phones and tablets. IoT devices are embedded with electronics and provided with network connectivity that enable these devices to collect, store and exchange data. The network connectivity may include, for example, Bluetooth® connectivity, Wi-Fi connectivity, and/or cellular network connectivity. An IoT device may additionally have computational capability, with various software (e.g., apps) and sensors. An IoT device may be controlled remotely across existing network infrastructure. An IoT device may use the network connectivity to communicate with other IoT devices, or other types of devices (e.g., a particular server or computer) across the Internet.

As IoT networks continue to evolve, different providers and vendors have developed differing models, protocols, and ontological and semantic architectures to support the implementation of their respective IoT networks. Accordingly, devices and networks associated with particular providers or vendors may not be interoperable with other providers and vendors.

To address these limitations, some consideration has been given to standardizing the semantic models. Unfortunately, it has been determined that previously established domain models, name spaces and languages are not easily supplanted, thus rendering any standardization attempt incomplete at best.

BRIEF DESCRIPTION OF THE DRAWINGS

FIG. 6 is an exemplary messaging diagram associated with the process of FIG. 5.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A domain ontology represents concepts and models within a specific domain, such as a smart home or smart city. Particular meanings of terms applied to that domain are provided by the domain ontology. Therefore, different IoT platforms, vendors, and providers or even organizations representing or associated with multiple vendors or providers may have their own way to describe and segment domains. However, domain ontologies from different vendors, organizations, or even standards bodies may overlap or may be disjoint. For example, the term 'car' has many different meanings. An ontology in the domain of automobiles would map the term car to an automobile and an ontology in the domain of railways would map the term car to a train carriage, while an ontology in the domain of elevators would map the term car to an elevator transport. Different ontologies from the same domain arise due to different languages, different intended usage of the ontologies, and different perceptions of the domain.

Since domain ontologies represent concepts in very specific ways, ontologies over different domains are often incompatible. Consistent with embodiments described herein, an IoT interoperability platform may ingest or otherwise examine ontologies from different domains and merge them into a generalized semantic model based on lexical, semantic, and contextual information, enabling devices and software from different vendors or providers to work together. Furthermore, upon generation of the generalized semantic model, software or applications created to utilize a particular ontological model may be easily converted or translated for use with other ontological models, devices, or systems that would otherwise be incompatible.

In an exemplary implementation, diverse ontologies may be matched or coordinated by matching their semantics based on both respective contexts and lexical permutations, such as synonyms, hyponyms, hypernyms, etc. In other implementations, in addition to, or as an alternative to contextual semantic matching, data from existing IoT implementations may be analyzed to identify patterns that appear across different ontological models. These patterns may be used to assist in the merging of the ontologies to generate or improve the generalized semantic model.

Figure 1:
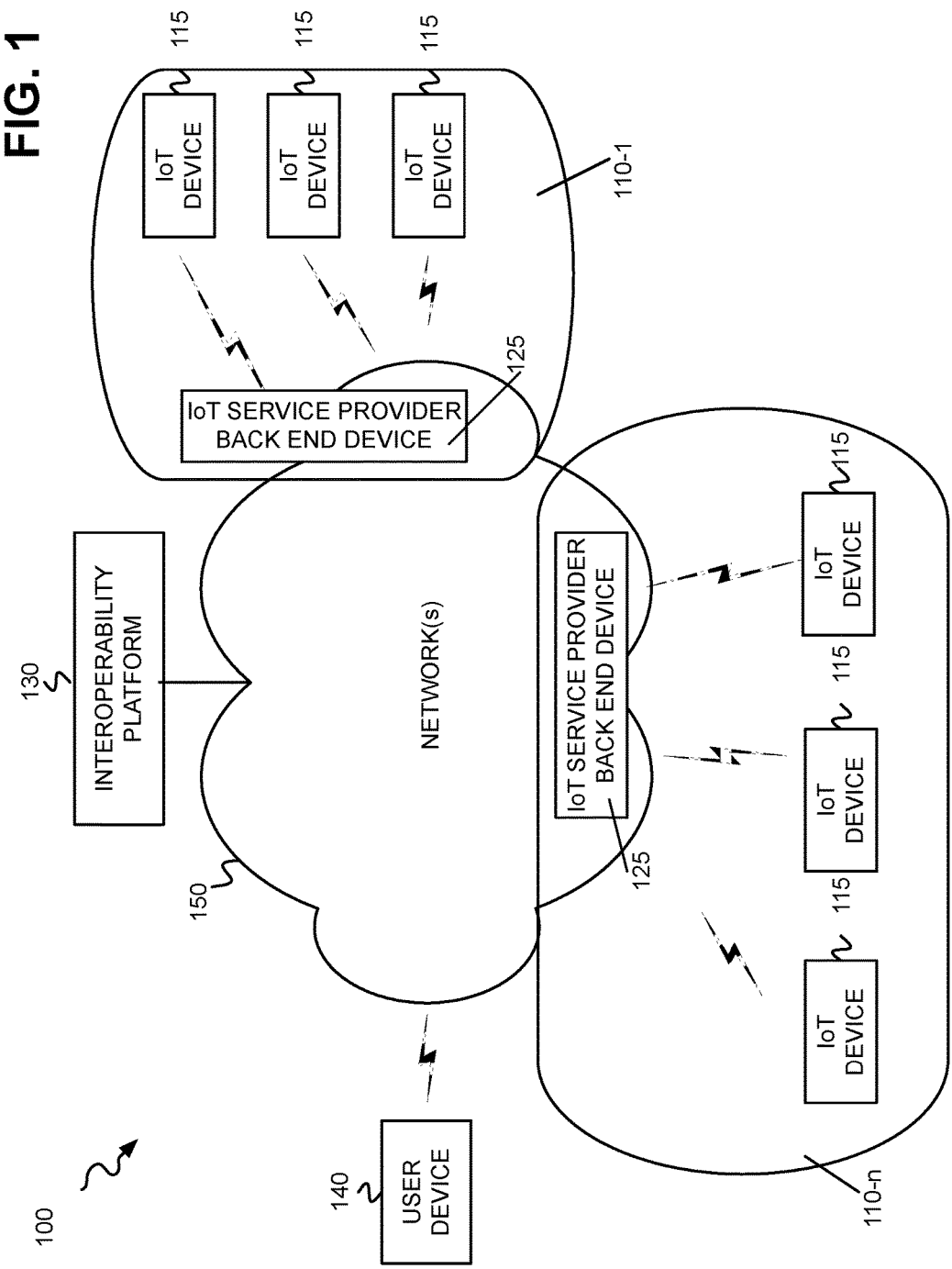
FIG. 1 is a diagram illustrating an exemplary environment in which systems and methods described herein may be implemented.

FIG. 1 is a diagram illustrating an exemplary environment 100 in which systems and methods described herein may be implemented. As illustrated, environment 100 may include a plurality of distinct IoT domains or platforms 110-1 to **110-*n* (referred to individually as IoT domain 110, and collectively as IoT domains 110), each incorporating a plurality of IoT devices 115 and one or more IoT service provider back end devices 125. In addition, environment 100 includes an interoperability platform 130 that communicates with service provider back end devices 125 to facilitate the exchange, dissemination, and usage of information between disparate IoT domains 110. Environment 100 may further include a plurality of user devices 140 and one or more networks 150 for enabling communication between IoT devices 115, gateway devices 120, IoT service provider back end devices 125, interoperability platform 130, and user devices 140**.

As briefly described above, the current state of IoT development includes a heterogeneous collection of IoT platforms in a variety of areas, some of which compete with and some of which are independent from each other. Such areas include home monitoring, energy/utilities, smart cities, agriculture, transportation, and healthcare. IoT devices 115 incorporated within such platforms may collect data or perform functions that may have applicability across IoT platforms.

Referring to FIG. 1, each IoT domain 110 represents a particular set of IoT devices 115, gateway device(s) 120, and IoT service provider back end device(s) 125 associated with a particular IoT provider, such as a Philips® Hue smart home, a General Electric smart grid, an Oracle smart city, etc. The set of IoT devices 115 in each IoT domain 110 collect data and/or perform functions consistent with their respective domain 110. The data collected is organized based on defined ontologies corresponding to each IoT domain 110. As shown in FIG. 1, respective ontologies are labeled 112-1 to 112-n, however in some circumstances a common ontology may be shared across multiple IoT domains 110.

According to an exemplary embodiment, IoT devices 115 include logic to collect, obtain, and/or generate IoT data as a part of an IoT device service. For example, IoT devices 115 may be implemented to include various technologies, such as a sensor, a tag, a camera, an antenna, a valve, a motor, etc., that collects, obtains, and/or generates IoT data. According to various implementations, IoT devices 115 may be stationary or mobile devices (e.g., an IoT device 140 attached to a drone, a mobile IoT device, an IoT device embedded or attached to a living organism (e.g., an animal or a person), etc.). IoT devices 115 may include a component (e.g., a Global Positioning System (GPS) chipset, etc.) that provides location-aware functionality. IoT devices 115 may be powered by an internal source, an external source, a battery, an outlet, electromagnetic waves, and so forth.

According to an exemplary embodiment, each IoT devices 115 includes at least one communication interface via which the IoT device 115 can transmit and receive data to and from its respective gateway device 120 and IoT service provider back end device 125. IoT devices 115 may also communicate with local devices (not illustrated) using various short-range communication technologies. For example, IoT devices 115 may obtain IoT data from a sensor as a part of the IoT device service.

According to an exemplary embodiment, IoT devices 115 include logic that supports the IoT services. For example, IoT device 115 includes logic to interpret and execute a command via an application programming interface (API) call, which is received via the communication interface. IoT devices 115 may also include logic that allows for identifying an API when performing the function or operation in response to the API call. According to implementations described herein, each IoT device 115 may be registered with IoT service provider back end device 125.

Although not shown in FIG. 1, in some embodiments, IoT environment may include gateway devices that operate as an interface between IoT service provider back end device 125 and IoT devices 115 in a given IoT domain 110. For example, where IoT devices 115 include short range wireless devices, a gateway device may be used to send/receive the signals to/from these devices.

IoT service provider back end devices 125 include logic to receive IoT data from IoT devices 115 network(s) 150 in a given IoT domain 110. In general, IoT service provider back end devices 125 may include devices such as application servers and cloud services servers configured to leverage the data and capabilities of IoT devices 115.

Consistent with embodiments described herein, interoperability platform 130 may include one or more devices that communicate with IoT service provider back end devices 125 (and potentially gateway devices 120 and/or IoT devices 115) via network(s) 150. In particular, as described in detail below, with respect to FIGS. 2-3, interoperability platform 130 may include components that receive IoT domain ontology information (e.g., from IoT service provider back end devices 125), deconstruct the ontology information, such as the definitions, attributes, and capabilities into basic lexical elements (e.g., to include synonyms, hyponyms, hypernyms, meronyms, etc.), and identify contexts that correspond to the identified basic lexical elements. As defined herein, a context refers to a given set of attributes and capabilities relating to a particular IoT device 115 or group of IoT devices 115, such as entities associated with the device(s) (e.g., a user, an address, a city, etc.), physical locations of the device(s), and relationships between one or more devices.

Once the ontology information has been deconstructed and contextualized, matches between elements (i.e., IoT devices 115) of different ontologies may be automatically identified. By leveraging both the lexical nature of the ontology elements as well as the contextual information relating to specific instances of these elements, such as specific IoT devices 115, locations, etc., cross-ontology matches may be more accurately identified. The identified matches are then used to allow data corresponding to the IoT domains 110 to be efficiently exchanged or acted upon across domains. For example, power consumption data in a smart home domain and defined using a first ontology may be shared with and used by a smart grid domain whose own data is defined using a second ontology.

Network(s) 150 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN/WLAN), a wired and/or wireless wide area network (WAN), a metropolitan area network (MAN), an intranet, the Internet, or a cable network (e.g., an optical cable network). In one implementation, network(s) 150 may include a PLMN or satellite mobile network connected to the Internet. In another implementation, network(s) 150 may include a fixed network (e.g., an optical cable network) connected to the Internet. In addition, network(s) 150 may include short term wireless networks, such as Bluetooth®, Z-Wave®, Zigbee®, Near Field Communication (NFC), etc. to connect IoT devices 115 to gateway devices 120, IoT service provider back end devices 125, and/or user devices 140.

User device 140 includes any electronic device that includes a communication interface (e.g., wired or wireless) for communicating via network(s) 150. User device 140 may include, for example, a cellular phone; a smart phone; a personal digital assistant (PDA); a wearable computer; a desktop, laptop, palmtop or tablet computer; or a media player. A "user" (not shown in FIG. 1) may be associated with user device 140, where the user may be an owner, operator, and/or a permanent or temporary user of user device 140.

The components of environment 100 may be implemented according to a centralized computing architecture, a distributed computing architecture, or a cloud computing architecture (e.g., an elastic cloud, a private cloud, a public cloud, etc.). Additionally, the components of environment 100 may be implemented according to one or multiple network architectures (e.g., a client device, a server device, a peer device, a proxy device, and/or a cloud device).

The number of components, the number of networks, and the arrangement in environment 100 are exemplary. According to other embodiments, environment 100 may include additional network elements, fewer network elements, and/or differently arranged network elements, than those illustrated in FIG. 1. For example, there may be additional IoT domains 110, IoT service provider back end devices 125, and interoperability platforms 130, and so forth. Additionally, or alternatively, according to other embodiments, multiple components may be implemented on a single device, and conversely, a component of environment 100 may be implemented on multiple devices. In other embodiments, one network in environment 100 may be combined with another network. In addition, though a single user device 140 is depicted in FIG. 1, multiple different user devices 140 may connect to network(s) 150, with each of the user devices 140 possibly being associated with a different user.

Figure 2:
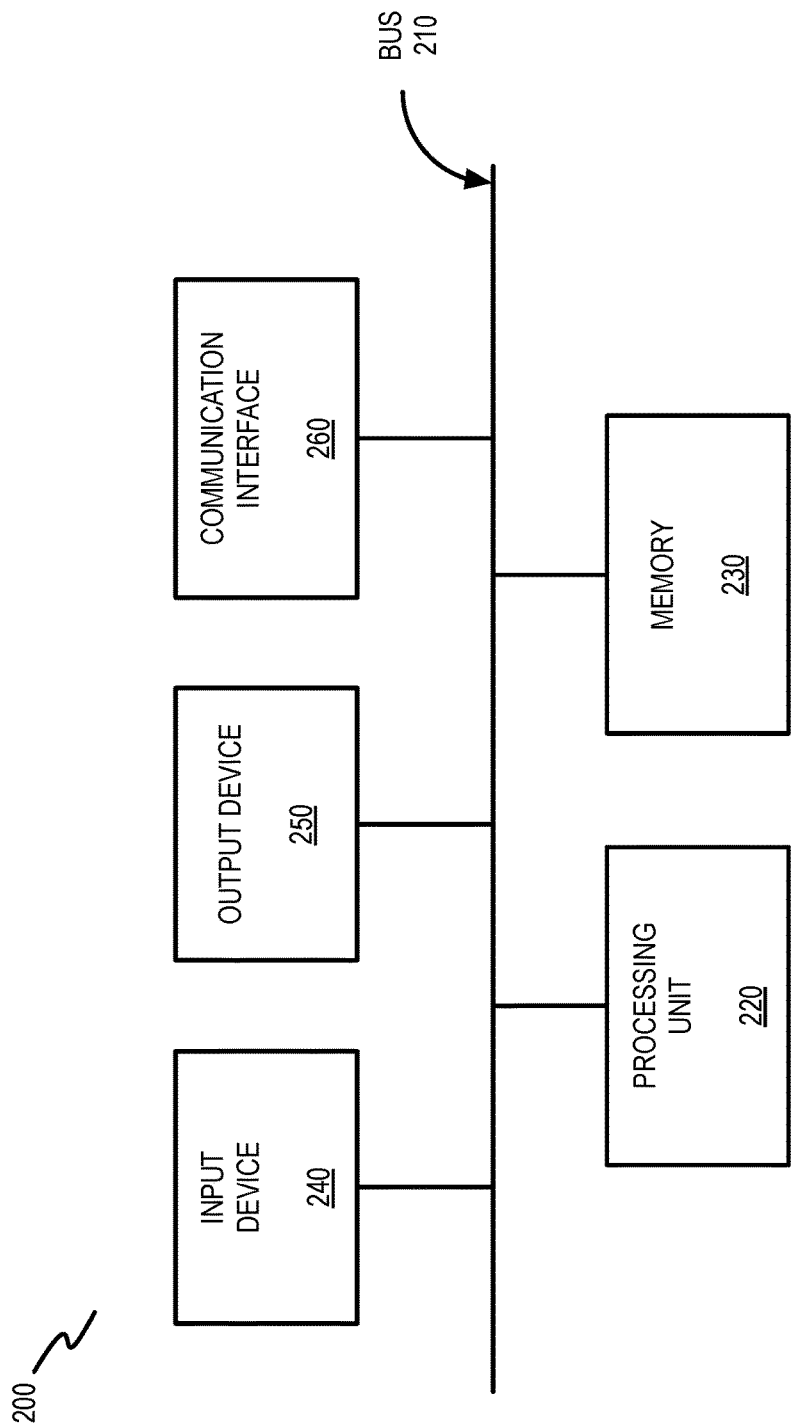
FIG. 2 illustrates an exemplary configuration of the interoperability platform, the IoT devices, the IoT service provider back end devices, and the user device of FIG. 1.

FIG. 2 illustrates an exemplary configuration of interoperability platform 130. Other devices in environment 100, such as IoT devices 115, IoT service provider back end devices 125, and user device 140 may be configured in a similar manner. Referring to FIG. 2, interoperability platform 130 may include bus 210, processing unit 220, memory 230, input device 240, output device 250 and communication interface 260. Bus 210 may include a path that permits communication among the elements of interoperability platform 130.

Processing unit 220 may include one or more processors, microprocessors, or processing logic that may interpret and execute instructions. Memory 230 may include a random access memory (RAM) or another type of dynamic storage device that may store information and instructions for execution by processing unit 220. Memory 230 may also include a read only memory (ROM) device or another type of static storage device that may store static information and instructions for use by processing unit 220. Memory 230 may further include a solid state drive (SDD). Memory 230 may also include a magnetic and/or optical recording medium (e.g., a hard disk) and its corresponding drive.

Input device 240 may include a mechanism that permits a user to input information to interoperability platform 130, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device. It should be understood that interoperability platform 130 or other devices in environment 100 may be implemented as headless or virtual devices that are not directly provided with input device 240 or output device 250 and may receive commands from other devices in environment 100.

Communication interface 260 may include one or more transceivers that interoperability platform 130 (or IoT devices 115, IoT service provider back end devices 125, or user devices 140) uses to communicate with other devices via wired, wireless or optical mechanisms. For example, communication interface 260 may include a modem or an Ethernet interface to a LAN or other mechanisms for communicating with elements in a network, such as networks 150 or another network. In other embodiments, communication interface 260 may include one or more radio frequency (RF) transmitters, receivers and/or transceivers and one or more antennas for transmitting and receiving RF data via networks 150.

The exemplary configuration illustrated in FIG. 2 is provided for simplicity. It should be understood that interoperability platform 130 (or other devices in environment 100) may include more or fewer devices than illustrated in FIG. 2. In an exemplary implementation, interoperability platform 130 performs operations in response to processing unit 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
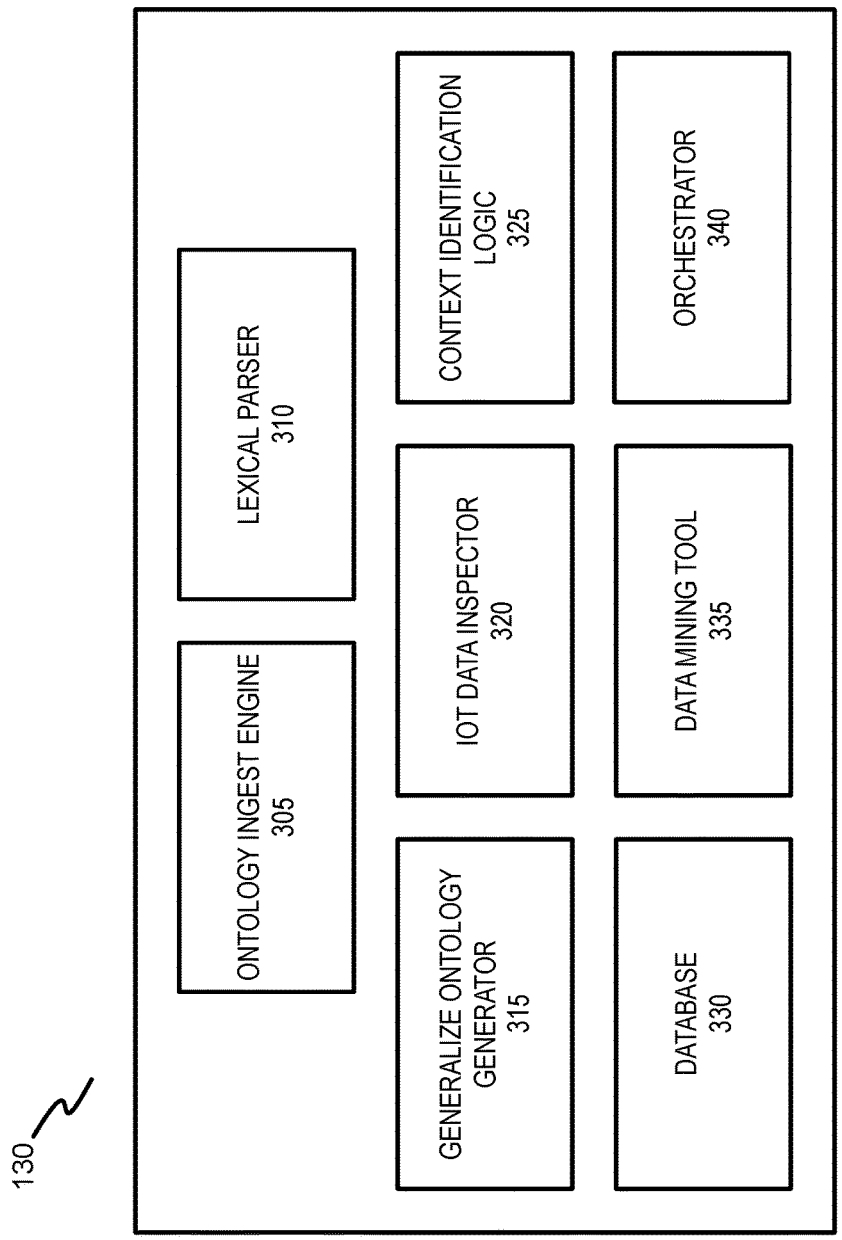
FIG. 3 is an exemplary functional block diagram of components implemented in the interoperability platform of FIG. 1.

FIG. 3 is an exemplary functional block diagram of components implemented in interoperability platform 130. In an exemplary implementation, all or some of the components illustrated in FIG. 3 may be implemented by processing unit 220 executing software instructions stored in memory 230.

Consistent with embodiments described herein, interoperability platform 130 may include an ontology ingest engine 305, a lexical parser 310, a generalized ontology generator 315, an IoT data inspector 320, context identification logic 325, database 330, data mining tool 335, and orchestrator 340. In alternative implementations, these components or a portion of these components may be located externally with respect to interoperability platform 130.

Ontology ingest engine 305 includes logic to receive information corresponding to a plurality of IoT ontologies. Exemplary ontologies include the Semantic Sensor Network (SSN) ontology by the World Wide Web Consortium (W3C), the OpenIOT ontology by the OpenIOT project, and the Suggested Upper Merged Ontology (SUMO) by the Institute of Electrical and Electronics Engineers (IEEE). In some embodiments, the ingested ontologies are constructed using the web ontology language (OWL), which is comprises a set of formal semantics built upon the resource description framework (RDF).

Lexical parser 310 includes logic to deconstruct the elements of the received ontologies into basic terms and their synonyms. For example, in one embodiment, the elements or nodes in each ontology that is ingested by ontology ingest engine 305 are examined using the WordNet® lexical database to identify synonym sets (synsets), hypernyms, hyponyms, and meronyms of the respective terms in each ontology. WordNet® (a Princeton University project) is an English language lexical database that groups words into sets of cognitive synonyms that each possess a distinct concept.

Generalized ontology generator 315 includes logic to generate generalized ontologies for each of the ingested IoT ontologies based on the basic terms and synonyms identified by lexical parser 310. For example, each generalized ontology may include a plurality of terms that have been identified as corresponding to a particular ontology element or node. The generalized ontologies may be stored, for example, in database 330.

According to an exemplary embodiment, IoT data inspector 310 includes logic that receives IoT data from IoT devices 115. For example, IoT data inspector 310 may identify packets, such as packets carrying IoT data. In one implementation, data inspector 310 may receive IoT data forwarded directly from IoT devices 115. In another implementation, data inspector 310 may receive authorized collections of IoT data from IoT service provider back end device 125 in communication with IoT devices 115.

According to one exemplary implementation, data inspector 310 includes logic to identify IoT data based on a device identifier of IoT device 115. Data inspector 310 may identify data pertaining to a particular IoT device 115 based on the device identifier. Data inspector 310 may extract IoT device information from the IoT data based on the generalized ontology associated with the particular IoT devices 115 from which it originated. For example, data inspector 310 may extract, for each IoT device 115, information relating to one or more of: a subject on which it acts or monitors, a geographic location, a type, and a network location (such as a network hierarchy or identification of a gateway device to which the device is connected). It is understood that IoT data corresponding to all IoT devices will not necessarily include each of these attributes. For example, some IoT devices 115 may determine a geographic location (e.g., via GPS), or may be assigned or associated with a particular geographic location, while other devices do not correspond to or utilize a particular geographic location. The extracted IoT data may be stored, for example, in database 330.

Context identification logic 325 includes logic to identify contexts within the received IoT data. For example, context identification logic 325 may determine one or more shared attributes or characteristics across IoT devices 115 based on the extracted IoT data. Context identification logic 325 may build contexts of IoT devices based on the identification of IoT devices having shared attributes. For example, IoT devices in a common geographic location may be linked together as a context, irrespective of the original IoT domain 110 in which they are included. Similarly, IoT devices 115 that act on a shared or common object may also be linked as a context. The identified contexts may be stored in database 330.

Consistent with embodiments described herein, interoperability platform 130 also builds cross-ontology domains based on groups of contexts identified by context identification logic 325. For example, context identification logic 325 may include logic to match contexts having a number of shared attributes, such as location, owner, etc. and group those contexts into domains. Once contexts have been identified based on the received IoT data and the generalized IoT ontologies, the contexts may be stored in database 330 and used to automatically create links between IoT devices or as templates for performing or configuring certain IoT operations or functions.

Figure 4:
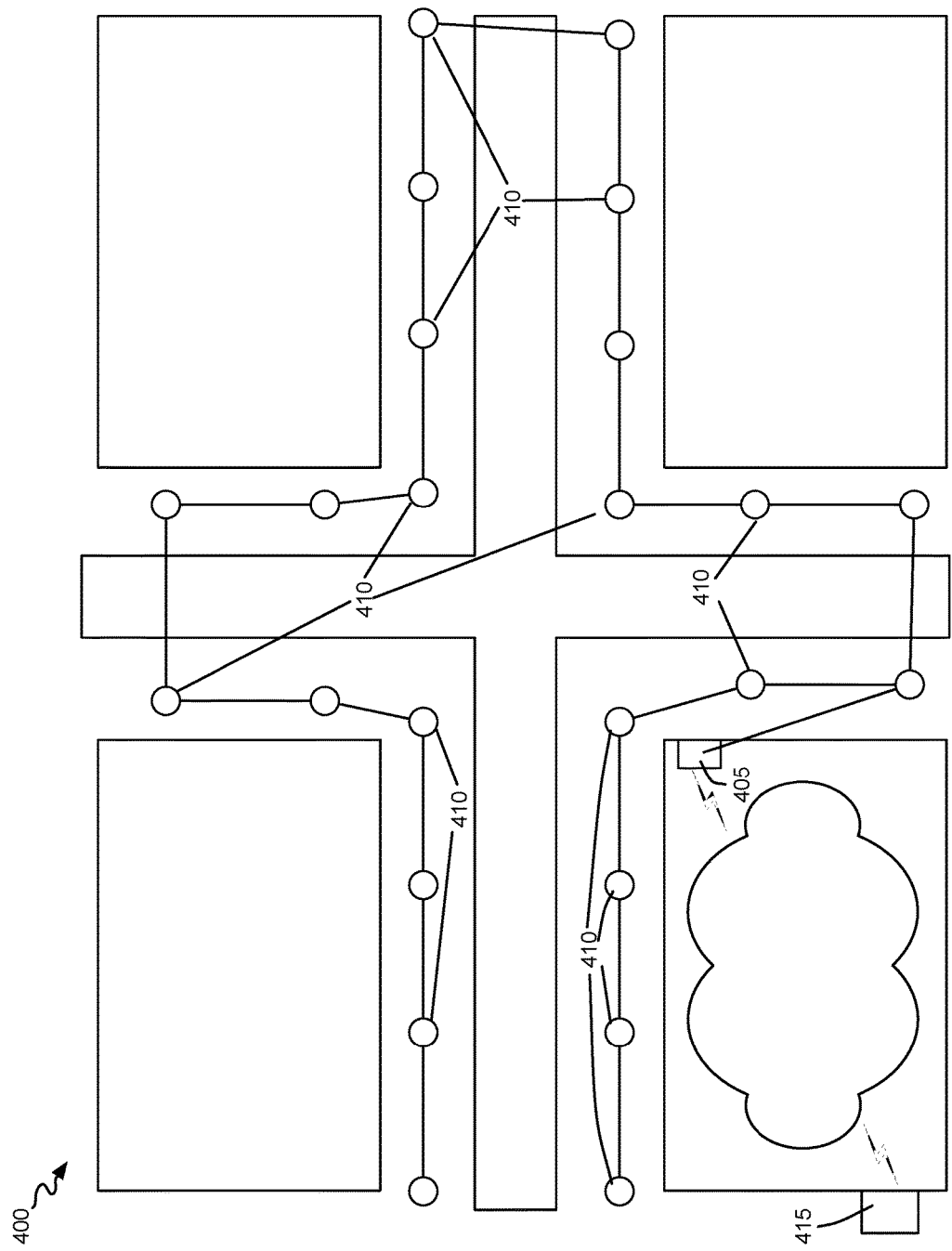
FIG. 4 is a diagram illustrating an example of the concepts described herein.

FIG. 4 is a diagram illustrating an example of the concepts described herein. As shown in FIG. 4, a business park 400 includes an irrigation controller 405 that is part of a smart building system designed to save the building operator expenses by controlling the operation of sprinklers 410 based on weather conditions, preset rules, etc. Business park 400 also includes a smart water meter 415 operated by the water utility. Smart water meter 415 operates to monitor the flow of water into the business park 400 for billing and diagnostic purposes. Assume for the sake of this example, that the irrigation controller 405 and smart water meter 415 are defined and operated in accordance with different ontologies. That is, each of these systems are operated and provided by different vendors or service providers.

Consistent with embodiments described herein, context identification logic 325 matches the generalized ontologies for each of the IoT systems to identify elements or nodes in each ontology that relate to water flow, water pressure, etc. Furthermore, the attributes for irrigation controller 405 and smart water meter 415, as extracted by data inspector 320, are matched based on geographic location (i.e., the location of business park 400). Based on the matched generalized ontology nodes and the shared attribute of geographic location, context identification logic 325 links irrigation controller 405 and smart water meter 415 and builds a context that includes irrigation controller 405 and smart water meter 415 and any other IoT devices 115 that may be associated therewith, such as a smart electrical outlet into which the irrigation controller 405 is connected, etc.

Data mining tool 335 includes logic to identify patterns in IoT data that may be used to identify additional contexts or to augment existing contexts with additional elements or devices. For example, in parsing natural languages, it is understood that some words tend to be co-located or be associated with other words, such as hammer and nail, bread and butter, salt and pepper, etc. These very strong associations, although based partly on the meanings of the words themselves, are more typically based on the number of repeated occurrences of the word combinations. The repetitions reinforce the association, in effect creating a self-fulfilling prophecy. In other words, the terms are strongly associated with each other because they have always been strongly associated with each other. Similar behaviors may be observed from the extracted IoT data—some IoT devices are associated with each other, not only based on a particular set of shared attributes, but in some instances in spite of a lack of shared attributes. These relationships may only be ascertained by examining a large set of IoT data over time.

In particular, data mining tool 335 includes logic to analyze at least a portion of the received IoT data for patterns or clustering or other data mining techniques by examining, for example, a frequency with which particular IoT devices are associated. For example, when a pattern or cluster of multiple events or contexts across different domains is identified (e.g., by context identification logic 325), data mining tool 335 may identify more definitive relationships. Such relationships across different domains with different ontologies may include the same subjects given different names, different objects with shared attributes, etc. In relation to clustering patterns, supervised machine learning may be performed with human labeling, or probe commands may be transmitted to the respective domains to ascertain the appropriateness of the responses received. In response, data mining tool 335 may assign different statistical significance values to different patterns identified by context identification logic 325 to produce more useful or accurate ontology model. In some embodiments, data mining tool 335 may be provided access to one or more complete vertical IoT data (i.e., including registration, integration, and utilization data) for one or more IoT domains 110. Data mining tool 335 may apply the above-described data mining tools to the vertical IoT data to identify comprehensive usage patterns.

The identified patterns may be used to supplement or add to the contexts identified by context identification logic 325. In one embodiment, contexts identified by context identification logic 325 may be ranked or otherwise prioritized based on the results of data mining tool 335, such that higher ranking contexts may be created for particular sets of IoT devices 115 in lieu of lower ranking contexts involving the same (or a subset/superset of) IoT devices 115.

Orchestrator 340 includes logic to receive instructions regarding IoT operations, format a task graph to identify operations and processes to be performed by one or more IoT service provider back end devices 125 and/or IoT devices 115, format the instructions based on the environments and ontologies of the identified IoT service provider back end devices 125 and/or IoT devices 115 based on the generalized ontologies generated by ontology generator 315, as described above. Orchestrator 340 then sends instructions to IoT service provider back end devices 125 and/or IoT devices 125 for execution. In some embodiments, the instructions may be received/retrieved, in the form of sets of rules configured for a particular context or domain of contexts, from database 330. In other embodiments, the instructions may be received by users of user devices 140.

Once a rule or request is generated or received, orchestrator 340 generates a task graph that identifies the IoT devices 115 or back end service devices 125 necessary to execute the requested action and determines the commands or requests applicable to each device. For example, the commands or request may be formatted in accordance with the underlying ontologies and platforms of the particular devices. In some instances the tasks may be transmitted on a schedule to accommodate dependencies that may be identified between device requests. Based on the generated task graph, orchestrator 340 transmits the identified tasks to respective devices for execution. In some embodiments, orchestrator 340 may be further configured to requests responses from any tasks devices regarding completion of respective tasks. Furthermore, in some embodiments, task requests for some IoT devices 115 may be necessarily transmitted via the associated IoT service provider back end device 125.

Using the example of FIG. 4, orchestrator 340 may apply a business rule to modify an irrigation program at irrigation controller 405 when water meter 415 perceives a reduction in water pressure below a threshold amount. As described above, in this example, the water utility IoT platform and the smart building IoT platform are operated and supported by different, otherwise incompatible systems. Based on the generalized ontologies, a context is created that includes both the smart water meter 415 and the irrigation controller 405. Furthermore, the identified context allows for IoT data from both systems to be received, integrated, and subsequently leveraged in the manner described above.

In this example, orchestrator 340, when applying the above-described rule, may determine, based on received IoT data that water pressure reported by smart water meter 415 has dropped below the threshold. In response, orchestrator 340 generates and transmits a task to irrigation controller 405 that, for example, causes irrigation controller 405 to adjust a run schedule of irrigation controller 405, reduce a number of concurrent zones, etc. As described above, the tasks created and transmitted by orchestrator 340 may be formatted based on the IoT platform and ontology associated with the smart building platform.

Figure 5:
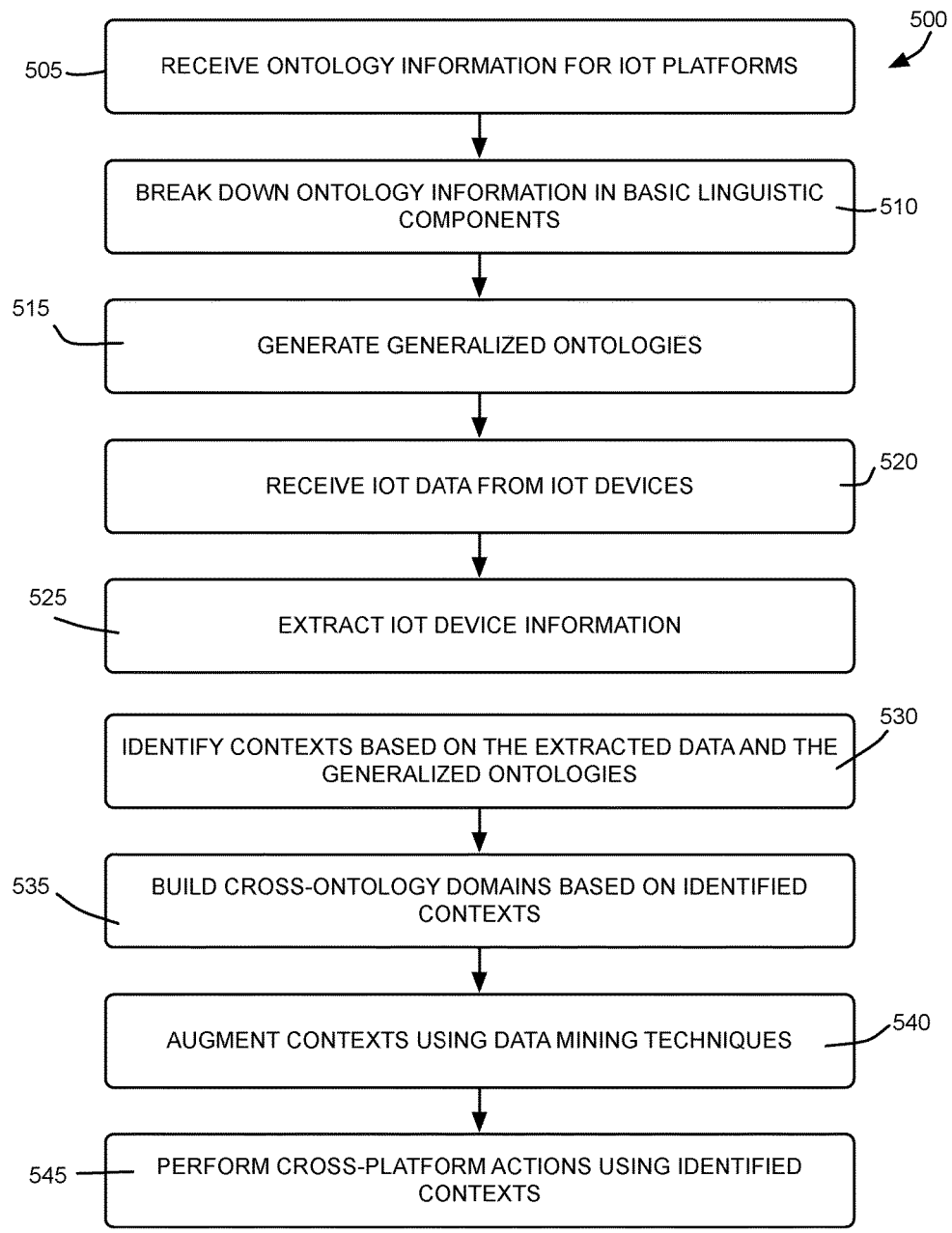
FIG. 5 is a flow diagram that illustrates an exemplary process for providing IoT interoperability, as described herein.

FIG. 5 is a flow diagram that illustrates an exemplary process 500 for providing IoT interoperability, as described herein. The exemplary process of FIG. 5 may be implemented by interoperability platform 130, in conjunction with IoT device 115, IoT back end devices 105, and user device 140. FIG. 6 is an exemplary messaging diagram associated with process 500.

Process 500 may begin with interoperability platform 130 receiving ontology information for a plurality of IoT platforms (block 505). For example, ontology ingest engine 305 receives information corresponding to a plurality of IoT ontologies, such as the SSN ontology, the OpenIOT ontology, and the SUMO. As described above, each IoT platform may utilize the same or different ontologies to define the relationships between entities in the platform. FIG. 6 depicts interoperability platform 130 receiving 600-1/600-2 ontology information from IoT service provider back end device 125-1 and IoT service provider back end device 125-2, respectively. Although shown as being received from IoT service provider back end devices 125, in some embodiments, ontology information may be received via out of band means, such as directly from the IoT platform or via resources made available by the IoT platform.

Interoperability platform 130 breaks down the received ontologies into basic linguistic components (block 510). For example, lexical parser 310 analyzes the received ontologies and deconstructs the elements of the received ontologies into basic terms and their synonyms. Generalized ontologies for each received ontology are created based on the identified basic linguistic components (block 515). For example, generalized ontology generator 315 generates the generalized ontologies for each of the ingested IoT ontologies based on the basic terms and synonyms identified by lexical parser 310. In some embodiments, each generalized ontology may include a plurality of terms that have been identified as corresponding to a particular ontology element or node.

IoT data may be received from a plurality of IoT platforms (block 520). For example, IoT data inspector 310 includes logic that receives IoT data from IoT devices 115 and/or IoT service provider back end devices 125. IoT device information is extracted from the IoT data (block 525). For example, data inspector 310 may extract IoT device information from the IoT data based on the generalized ontology associated with IoT platform that includes the particular IoT devices 115, such as the name or class of the device, the subject on which the device acts or monitors, a geographic location corresponding to the device, a type of the device, and a network location of the device. FIG. 6 depicts interoperability platform 130 receiving 605-1a/605-2b ontology information from IoT device 115-1, IoT service provider back end device 125-1, IoT device 115-2, and IoT service provider back end device 125-2, respectively. Depending on the implementation, IoT data may be received from any combination of devices in the respective IoT platforms.

Contexts are identified based on the received extracted IoT data (block 530). For example, context identification logic 325 identifies contexts within the received IoT data by identifying one or more shared attributes or characteristics across IoT devices 115 based on the extracted IoT data and the generalized ontologies corresponding to the extracted IoT data.

Consistent with embodiments described herein, interoperability platform 130 also builds cross-ontology domains based on groups of contexts (block 535). For example, context identification logic 325 matches contexts having a number of shared attributes, such as location, owner, etc. and group those contexts into domains.

The identified contexts or cross-ontology domains are augmented using data mining techniques (block 540). For example, data mining tool 335 may identify patterns in IoT data that may be used to identify additional contexts or to augment existing contexts with additional elements or devices. In particular, data mining tool 335 may analyze at least a portion of the received IoT data for patterns or clustering by examining, for example, a frequency with which particular IoT devices are associated.

The identified contexts are leveraged to perform cross-platform actions (block 545). For example, user commands (item 610 in FIG. 6) may be received or business rules may be established to leverage the identified contexts to enable monitoring and control of IoT devices in different initial platforms or domains. Once an action or request is received, instructions may be generated in accordance with the underlying IoT platforms and transmitting to the respective IoT devices 115 (or to respective IoT service provider back end devices 125). FIG. 6 depicts interoperability platform 130 transmitting task 615-1 to IoT device 115-1 and task 615-2 to IoT device 115-2.

In one embodiment, orchestrator 340 may generate a task graph to identify operations and processes to be performed by one or more IoT service provider back end devices 125 and/or IoT devices 115, format the instructions based on the environments and ontologies of the identified IoT service provider back end devices 125 and/or IoT devices 115, and transmit the task instructions to IoT service provider back end devices 125 and/or IoT devices 125 for execution. In some embodiments, responses are received regarding completion of respective tasks to facilitate reporting, notifications, or execution of dependent tasks. FIG. 6 depicts interoperability platform 130 receiving responses 620-1 and 620-2 from IoT devices 115-1 and 115-2, respectively.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIG. 5, and message flows with respect to FIG. 6, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
 receiving, by a network device, at least a first set of framework definitions that are specific to a first device platform, and a second set of framework definitions that are specific to a second device platform that is different than the first device platform, wherein each of the first and second device platforms comprises at least one device,
 wherein the devices comprise Internet of Things (IoT) devices and wherein the first and second sets of framework definitions comprise first and second IoT ontologies;
 generating, by the network device, a plurality of generalized framework definitions for each of the first and second device platforms, wherein the plurality of generalized framework definitions comprise basic linguistic components corresponding to elements in the respective first and second sets of framework definitions;
 receiving, by the network device, data from the at least one device for each of the first and second device platforms;
 extracting, by the network device, data from the received data based on the plurality of generalized framework definitions;
 automatically identifying, by the network device, one or more contexts that include at least one device for each of the first and second device platforms based on the extracted data,
 wherein automatically identifying one or more contexts comprises identifying, from the at least one device of each of the first and second device platforms, two or more devices that share at least one common attribute, including a location, a type, or subject; and
 transmitting, by the network device, instructions to the at least one device for each of the first and second device platforms based on one of a rule or a request associated with the identified one or more contexts.

2. The method of claim 1, wherein the basic linguistic components corresponding to elements in the respective plurality of framework definitions comprise synonyms of the elements in the respective first and second IoT ontologies.

3. The method of claim 1, wherein the at least one device comprises at least one of an individual IoT device or an IoT back end device that receives IoT data from a plurality of individual IoT devices.

4. The method of claim 1, further comprising:
 identifying, by the network device, two or more identified contexts having at least one shared attribute; and
 grouping the two or more identified contexts as a cross-platform domain.

5. The method of claim 1, wherein transmitting instructions further comprises:
 generating, based on the rule or the request, tasks for each of the at least one device for each of the first and second device platforms;
 formatting the tasks based on the respective first and second IoT ontologies; and
 transmitting the formatted tasks to the each of the at least one device for each of the first and second device platforms, respectively.

6. The method of claim 1, further comprising:
 performing data mining on the received data to identify patterns relating to the devices; and
 augmenting the identified contexts based on the identified patterns.

7. A network device, comprising:
 a communication interface connected to a network;
 a memory to store instructions; and
 a processing unit configured to execute one or more of the instructions to:
  receive, via the network, at least a first set of framework definitions that are specific to a first device platform, and a second set of framework definitions that are specific to a second device platform that is different than the first device platform, wherein each of the first and second device platforms comprises at least one device,
  wherein the devices comprise Internet of Things (IoT) devices and wherein the first and second sets of framework definitions comprise first and second IoT ontologies;
  generate a plurality of generalized framework definitions for each of the first and second device platforms, wherein the plurality of generalized framework definitions comprise basic linguistic components corresponding to elements in the respective first and second sets of framework definitions;

store the plurality of generalized framework definitions in the memory;

receive, via the network, data from the at least one device for each of the first and second device platforms;

extract data from the received data based on the plurality of generalized framework definitions;

automatically identify one or more contexts that include at least one device for each of the first and second device platforms based on the extracted data, wherein the one or more instructions to automatically identify one or more contexts further comprise one or more instructions to identify, from the at least one device of each of the first and second device platforms, two or more devices that share at least one common attribute, including a location, a type, or subject; and transmit instructions to the at least one device for each of the first and second device platforms based on one of a rule or a request associated with the identified one or more contexts.

8. The network device of claim 7, wherein the at least one device comprises at least one of an individual Internet of Things (IoT) device or an IoT back end device that receives IoT data from a plurality of individual IoT devices.

9. The network device of claim 7, wherein the basic linguistic components corresponding to elements in the respective first and second sets of framework definitions comprise synonyms of the elements in the respective first and second IoT ontologies.

10. The network device of claim 7, wherein the processing unit is further configured to:

identify two or more identified contexts having at least one shared attribute; and group the two or more identified contexts as a cross-platform domain.

11. The network device of claim 7, wherein the processing unit configured to transmit instructions is further configured to:

generate, based on the rule or the request, tasks for each of the at least one device for each of the first and second device platforms;

format the tasks based on the respective IoT ontologies; and transmit the formatted tasks to the each of the at least one device for each of the first and second device platforms, respectively.

12. The network device of claim 7, wherein the processing unit is further configured to:

perform data mining on the received data to identify patterns relating to the devices; and augment the identified contexts based on the identified patterns.

13. A non-transitory storage medium storing instructions executable by a computational device, wherein the instructions comprise instructions to cause the computational device to:

receive, via the network, at least a first set of framework definitions that are specific to a first device platform, and a second set of framework definitions that are specific to a second device platform that is different than the first device platform, wherein each of the first and second device platforms comprises at least one device, wherein the devices comprise Internet of Things (IoT) devices and wherein the first and second sets of framework definitions comprise first and second IoT ontologies;

generate a plurality of generalized framework definitions for each of the first and second device platforms, wherein the plurality of generalized framework definitions comprise basic linguistic components corresponding to elements in the respective first and second sets of framework definitions;

receive, via the network, data from the at least one device for each of the first and second device platforms;

extract data from the received data based on the plurality of generalized framework definitions;

automatically identify one or more contexts that include at least one device for each of the first and second device platforms based on the extracted data, wherein the instructions to automatically identify one or more contexts further comprise one or more instructions to identify, from the at least one device of each of the first and second device platforms, two or more devices that share at least one common attribute, including a location, a type, or subject; and transmit instructions to the at least one device for each of the first and second device platforms based on one of a rule or a request associated with the identified one or more contexts.

14. The non-transitory storage medium of claim 13, wherein the at least one device comprises at least one of an individual Internet of Things (IoT) device or an IoT back end device that receives IoT data from a plurality of individual IoT devices.

15. The non-transitory storage medium of claim 13, wherein the basic linguistic components corresponding to elements in the respective first and second sets of framework definitions comprise synonyms of the elements in the respective first and second IoT ontologies.

16. The non-transitory storage medium of claim 13, wherein the instructions to transmit instructions comprise instructions to cause the computational device to:

generate, based on the rule or the request, tasks for each of the at least one device for each of the first and second device platforms;

format the tasks based on the respective IoT ontologies; and transmit the formatted tasks to the each of the at least one device for each of the first and second device platforms, respectively.

* * * * *